2,482,127

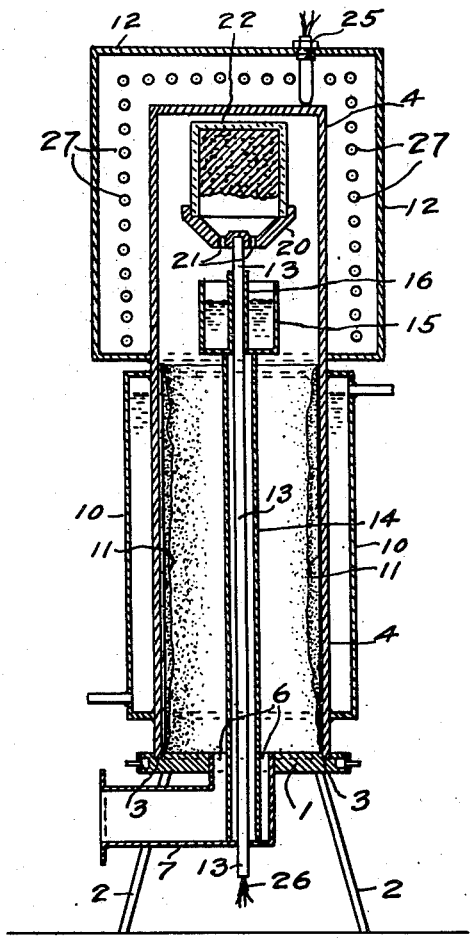
Sept. 20, 1949.   A. W. SCHLECHTEN ET AL   2,482,127
APPARATUS FOR REFINING METALS
Filed Aug. 7, 1946
WILLIAM J. KROLL,
ALBERT W. SCHLECHTEN,
AND LELAND A. YERKES
INVENTORS
BY J. T. Mothershead
ATTORNEY Patented Sept. 20, 1949

UNITED STATES PATENT OFFICE 2,482,127

APPARATUS FOR REFINING METALS

Albert W. Schlechten, Corvallis, and William J. Kroll and Leland A. Yerkes, Albany, Oreg., assignors to the United States of America as represented by the Secretary of the Interior Application August 7, 1946, Serial No. 688,869

3 Claims. (Cl. 266—37)

(Granted under the act of March 3, 1883, as amended April 30, 1928; 370 O. G. 757)

The invention described herein may be manufactured and used by or for the Government of the United States for governmental purposes without the payment to us of any royalty thereon, in accordance with the provisions of the act of April 30, 1928 (Ch. 460, 45 Stat. L. 467).

This invention relates to a method and apparatus for the recovery of zirconium from a mixture produced by the reaction of a zirconium compound with a reducing agent.

One method for producing zirconium is by reduction of a zirconium compound, such as zirconium tetrachloride (ZrCl₄) vapors, with an agent, such as magnesium. The reaction provides a mixture of zirconium, magnesium chloride ($MgCl_2$), and excess magnesium.

Hydrogen may also be included in the reaction mixture and may be absorbed by the newly formed zirconium metal. The source of this hydrogen may be gas dissolved in the magnesium metal used in the reduction operation or may be a small amount of moisture which was accidentally present in the reduction apparatus and which was decomposed during the reduction operation.

Recovery of zirconium from the reaction mixture requires the removal of the magnesium chloride and any excess magnesium. It is found that the zirconium may be freed of the magnesium chloride and excess magnesium by placing the reaction crucible or vessel in upright position and subjecting its content (the reaction mixture) to evaporation in a vacuum at an elevated temperature in the range of about 750° C. to about 950° C., the evaporation taking place from the exposed salt surface. It is also found, however, that at a temperature of about 750° C. when the magnesium is melted, a sudden and violent boiling takes place in the reaction mixture, the boiling causing the magnesium chloride to splash over the sides of the reaction crucible or vessel. This splashing is objectionable for several important reasons. The splashed material is difficult to remove from the distillation apparatus parts on which it falls. The suddent splashing of the molten material may also burn or melt the vacuum seal which is generally located at the base of the distillation apparatus and usually includes solid wax.

The boiling which produces the indicated splashing is caused by magnesium vapor and by some hydrogen that is accidentally present, the vapor and the hydrogen escaping through the molten material. Here, it should be noted that magnesium at a temperature of 750° C. has a vapor pressure of several centimeters.

The above explained vacuum distillation method presents another important objection in that substantially complete evaporation of the magnesium chloride, which follows the boiling or gassing period, usually requires many hours. Such lengthy operation is so uneconomical as to be impractical.

It is part of the present discovery that the above described disadvantages can be eliminated by withdrawing under gravity action the molten magnesium chloride from the crucible or vessel containing the reaction mixture. In a preferred embodiment of this invention, the crucible containing the reaction mixture is placed in inverted position in vacuum distillation apparatus; the mixture is subjected to a temperature at which the magnesium chloride is molten; and the molten magnesium chloride, the magnesium and magnesium chloride vapors, and the gaseous hydrogen flow downwardly from the inverted crucible under gravity action. In a relatively short period of time, the zirconium metal is freed from the other components of the reaction mixture. About ninety per cent or more of the magnesium chloride is collected in compact form, practically free of magnesium, in a pot or container below the inverted crucible. The evaporated magnesium chloride, which usually is not more than ten per cent of the chloride in the reaction mixture, and the evaporated magnesium are condensed on the cooler parts of the distillation apparatus, for example, on a removable shield in a water-jacketed space.

In the practice of this invention, the zirconium may be recovered from the reaction mixture in two steps, separate apparatus being used for each step. The mixture is first heated at atmospheric pressure under a noble gas to melt the magnesium chloride which, when in the molten state, is removed by gravity flow. The mixture is then subjected to high vacuum distillation at elevated temperature in a vacuum furnace to evaporate the remaining magnesium chloride, hydrogen and magnesium.

Recovery of the zirconium in one step and in one apparatus—high vacuum distillation at elevated temperature—is preferred, since it is relatively simple and inexpensive and also eliminates the possibility of the zirconium and its coating of hygroscopic magnesium chloride being exposed to air while the reaction vessel is being transferred from a first heating and melting apparatus or furnace to vacuum furnace distillation equipment.

The preferred and simple form of this invention for the removal of the molten magnesium chloride provides the crucible or vessel containing the reaction mixture in a vertical but inverted position during the melting of the chloride. The invention, however, may be practiced with the crucible in a tilted or inclined position or provided with a tap hole so that the molten magnesium chloride is discharged from the reaction mixture by gravity flow.

It is, therefore, an object of this invention to provide an improved method for recovering zirconium metal from a reaction mixture.

Another object is to provide a relatively simple, efficient, inexpensive, and rapid method for separating zirconium metal from the other components of a reaction mixture.

Still another object is to provide improved apparatus for recovering zirconium metal from a reaction mixture.

Other objects and advantages will appear from the following description, the appended claims, and the accompanying drawing which illustrates a preferred embodiment of apparatus of the present invention for carrying out the preferred form of method of the present invention.

The apparatus—high vacuum, high temperature distillation equipment with condenser—of the accompanying drawing comprises a base, disc or plate 1 which is supported by a stand 2 and which has an annular groove 3 in its upper face. A tubular member or housing 4 having its upper end closed is mounted on the base 1. The lower end of the tubular member 4 is open and has its edge extending into the annular groove 3, which is provided with wax to make a vacuum-tight joint between the tubular member 4 and the base 1.

An outlet opening 6 in the base 1 establishes communication between the interior of the tubular member 4 and a pipe 7 which is adapted for connection to a high vacuum pump or other device for exhausting the tubular member 4.

The lower portion of the tubular member is provided exteriorly with a water jacket 10 and interiorly with a removable shield 11, which extends somewhat beyond the levels defining the upper and lower limits of the water jacket 10 as illustrated in the drawing.

The closed top end and the upper part of the sides of the tubular member 4 are provided with a heating device 12, which may be an electrical resistance heater; a high frequency, electrical conduction heater; a gas burner; or an oil burner.

Two spaced and concentrically arranged pipes 13 and 14 extend through and along the axis of the tubular shield 11 and through the outlet opening 6. The lower end of the pipe 14 is supported by the exhaust pipe 7 (see drawing) and its upper end extends above the upper limit of the shield 11 and is substantially on a level with the lower limit of the heating device 12 (see drawing).

The lower end of the pipe 13 extends through the wall of the exhaust pipe 7 and is suitably secured in place in any desired manner. The upper end of the pipe 13 extends above the lower limit of the heating device 12.

A pot 15 has a central tube 16 which slidably receives the pipe 13. The pot 15 is adapted to be set in place by being lowered on to and along the upper end of the pipe 13 until it rests on and is supported in place by the upper end of the pipe 14 as shown in the accompanying drawing.

The upper end of the pipe 13 is adapted to support a funnel 20 having openings or perforations 21 so disposed in its base as to overlie that part of the pot 15 which extends between its tube 16 and its side walls.

The funnel 20 has a recess at its upper edge to snugly fit and support in a vertical, inverted position a crucible or vessel 22 containing a mixture resulting from the reaction of zirconium tetrachloride ($ZrCl_4$) and magnesium. The crucible 22 is intended to be the crucible in which the reaction of the zirconium tetrachloride and the magnesium took place.

The pot 15 is intended to collect the molten magnesium chloride flowing by gravity action from the reaction mixture in the inverted crucible 22 and through the funnel perforations 21.

The shield 11 serves as a condensation surface for magnesium chloride vapor and magnesium vapor.

A thermocouple 25 serves to measure the temperature of the heating device 12.

A thermocouple 26 serves to measure the temperature in the furnace or upper part of the illustrated apparatus. Protection for the wiring for the thermocouple 26 is provided by the pipe 13 through which it extends from a point exterior to the apparatus to a point within the space heated by the device 12.

The illustrated apparatus includes a heating zone and a condensing zone. The heating zone extends substantially between the levels defined by the lower limit of the heating device 12 and the closed top end of the tubular member or housing 4. The condensing zone extends substantially between the levels defined by the upper and lower limits of the water jacket 10.

*Operation*

In the practice of a preferred embodiment of this invention, the pot 15 is fitted to the pipe 13 and supported by the pipe 14. The funnel 20 is then mounted on the pipe 13. Next the crucible 22 containing a reaction mixture of zirconium metal, magnesium chloride (the residual salt), excess magnesium (the reducing agent), and usually some hydrogen, is placed in vertical, inverted position on the funnel 20 as illustrated.

The tubular member 4 with its shield 11, water jacket 10, and heater 12, is mounted on the base 1 and the joint therebetween is sealed with wax.

The heater 12 is operated to heat the reaction mixture in the crucible 22 at a temperature in the range of about 750° C to about 950° C.

The magnesium chloride, when in molten state, flows downwardly from the reaction mixture, through the perforations 21 in the funnel 20 and into the pot 15, which collects the chloride in compact ingot form.

The tubular member 4 is exhausted through the vacuum connection 7 at the same time that the shield 11 is cooled by the water jacket 10. Vapors of magnesium chloride and magnesium and gaseous hydrogen issue from the reaction mixture in a downward, gravity flow, pass through the funnel perforations 21, and downwardly along the cool shield 11, on which the vapors of magnesium chloride and magnesium condense.

The recovered zirconium metal usually adheres to the crucible 22 at the end of the melting and distillation operation and is in the form of a rough, semi-porous layer. Should any of the zirconium metal drop from the crucible 22, it will be collected and retained by the funnel 20.

Experience in the actual practice of this invention shows that it substantially reduces the time required for separating the zirconium metal from the other components of the reaction mixture, that the separated zirconium metal is remarkably clean, and that the separated magnesium chloride in ingot form is readily adapted for the production of magnesium metal.

It is found that the separation of the zirconium metal by the melting and distillation process of the present invention with the illustrated equipment requires only a five-hour operation, whereas the separation by total (only) vacuum evaporation of the magnesium chloride and magnesium components requires about an eight-hour operation. This comparison is made for two batches of equal weight and for operations carried out at the same temperature, maximum 950° C.

The zirconium metal is in cleaner condition when separated according to the present invention since the latter provides a longer period of exposure of the zirconium metal to the action of the vacuum. This longer exposure is included in the five-hour operation for freeing the zirconium metal and results from the gravity discharge of the magnesium chloride as rapidly as it melts.

The ingot of magnesium chloride collected in the pot 15 is readily adapted for the production of magnesium to be used in the reduction of zirconium tetrachloride. The magnesium chloride can be subjected to fusion electrolysis or to reduction by $CaC_2$ in a vacuum for the production of magnesium.

The foregoing is to be understood as illustrative since this invention includes all modifications and embodiments coming within the scope of the appended claims.

We claim:

1. Apparatus for recovering zirconium from a reaction mixture including residual salt and excess reducing agent, said apparatus comprising: a base having an outlet therein for connection to a vacuum pump; an open bottom housing supported by said base and having the interior space thereof communicating with said outlet; a gas-tight seal for the joint between said base and said housing; concentric tubes extending through said outlet and substantially axially of said housing; a funnel supported by the inner one of said concentric tubes; an open top reaction vessel containing said mixture and supported in inverted position by said funnel; a container encircling said inner tube, resting on the outer one of said tubes, and positioned to collect molten salt flowing from said funnel under gravity action; and means external of said vessel for heating the contents of said vessel and of said container.

2. Apparatus for recovering a substance from a reaction mixture contained in the vessel in which the reaction took place, said apparatus comprising: a base having an outlet therein adapted for connection to a vacuum pump, a housing closed at its top and sides and having an open bottom, said housing being supported by said base and having the interior space thereof communicating with said outlet, a gas-tight seal for the joint between said base and said housing, support means extending upwardly within the interior space within said housing and substantially axially thereof, a funnel-like member supported by said means, a reaction vessel containing said mixture and supported by said member, said vessel in said supported position having open outlet at a level below the level of the mixture therein, a container supported by said means to collect molten material flowing under gravity action from said mixture through said outlet and through said funnel-like member, and means external of said vessel for heating the mixture in said vessel to a temperature at which said material is molten.

3. Apparatus for recovering zirconium from a reaction mixture contained in the vessel in which the reaction took place, the mixture including magnesium chloride and magnesium in addition to zirconium, said apparatus comprising: a base having an outlet therein adapted for connection to a vacuum pump, a housing closed at its top and sides and having an open bottom, said housing being supported by said base having the interior space thereof communicating with said outlet, a gas-tight seal for the joint between said base and said housing, concentrically arranged inner and outer tubes extending through said outlet and upwardly within the interior space of said housing, a funnel-like member supported by the upper end of said inner tube, an open top reaction vessel containing said mixture and supported in inverted position by said member, means external of said vessel for heating the mixture therein to a temperature at which the magnesium chloride is molten, and a container encircling said inner tube and supported by the upper end of said outer tube to collect molten magnesium chloride flowing under gravity action from said mixture and through said funnel-like member.

ALBERT W. SCHLECHTEN.
WILLIAM J. KROLL.
LELAND A. YERKES.

REFERENCES CITED

The following references are of record in the file of this patent:

UNITED STATES PATENTS

| Number | Name | Date |
|---|---|---|
| 953,196 | Ellis | Mar. 29, 1910 |
| 1,059,307 | Lance | Apr. 15, 1913 |
| 1,568,685 | Moore | Jan. 5, 1926 |
| 2,214,211 | Von Zeppelin et al. | Sept. 10, 1940 |
| 2,252,052 | Van Embden | Aug. 12, 1941 |
| 2,282,654 | Horner | May 12, 1942 |
| 2,386,189 | Bagley | Oct. 9, 1945 |
| 2,387,677 | Pidgeon | Oct. 23, 1945 |